United States Patent
Li et al.

(10) Patent No.: US 9,158,964 B2
(45) Date of Patent: Oct. 13, 2015

(54) OBJECT RECOGNIZING APPARATUS AND METHOD

(75) Inventors: Liang Li, Beijing (CN); Weiguo Wu, Beijing (CN)

(73) Assignee: Sony Corporation, Tokyo (JP)

( * ) Notice: Subject to any disclaimer, the term of this patent is extended or adjusted under 35 U.S.C. 154(b) by 545 days.

(21) Appl. No.: 13/477,413

(22) Filed: May 22, 2012

(65) Prior Publication Data

US 2012/0314079 A1 Dec. 13, 2012

(30) Foreign Application Priority Data

Jun. 13, 2011 (CN) .......................... 2011 1 0170812

(51) Int. Cl.
*H04N 7/18* (2006.01)
*G06K 9/00* (2006.01)

(52) U.S. Cl.
CPC .................................. *G06K 9/00295* (2013.01)

(58) Field of Classification Search
None
See application file for complete search history.

(56) References Cited

U.S. PATENT DOCUMENTS

| | | | |
|---|---|---|---|
| 6,809,760 B1 * | 10/2004 | Takagi et al. | 348/211.9 |
| 2004/0223190 A1 * | 11/2004 | Oka | 358/302 |
| 2008/0198231 A1 * | 8/2008 | Ozdemir et al. | 348/159 |
| 2009/0245573 A1 * | 10/2009 | Saptharishi et al. | 382/103 |
| 2009/0296985 A1 * | 12/2009 | Lv et al. | 382/103 |
| 2010/0111370 A1 * | 5/2010 | Black et al. | 382/111 |

* cited by examiner

*Primary Examiner* — Sath V Perungavoor
*Assistant Examiner* — Janese Duley
(74) *Attorney, Agent, or Firm* — Oblon, McClelland, Maier & Neustadt, L.L.P.

(57) ABSTRACT

An object recognizing apparatus and method are provided. The apparatus may include: a viewing direction estimating device configured for respectively estimating a first viewing direction of a first object captured by a first camera and a second viewing direction of a second object captured by a second camera; a feature extracting device configured for extracting one or more features respectively from an image containing the first object captured by the first camera and an image containing the second object captured by the second camera; and an object matching device configured for allocating a weight for each of the one or more features according to the first viewing direction and the second viewing direction, and calculating a similarity between the first object and the second object based on the one or more weighted features, to determine whether the first object and the second object are the same object.

12 Claims, 5 Drawing Sheets

OBJECT RECOGNIZING APPARATUS AND METHOD

CROSS-REFERENCE TO RELATED APPLICATION

The application claims priority to Chinese patent application No. 201110170812.7 submitted with the Chinese patent office on Jun. 13, 2011, entitled "Object Recognizing Apparatus and Method in Monitoring Network Including a Plurality of Cameras", the contents of which are incorporated herein by reference as if fully set forth.

FIELD

The present disclosure relates to object recognition, and more particularly, to an object recognizing apparatus and method used in a monitoring network including a plurality of cameras.

BACKGROUND

With respect to the current large intelligence monitoring system, how to acquire monitoring information of all the cameras associated with an object in a monitoring network including a plurality of cameras is an issue attracting much attention. For example, in the case that a thief enters a room in a building with a monitoring system, the administrator generally desires to obtain all the history images of the thief captured by the monitoring cameras in the whole building. In some monitoring system this is generally done manually, which exhausts large amount of time and human power.

A method has been suggested in which the images of the same object captured by different cameras are matched based on color and texture features. In the method, the similarity between the images of the same object is calculated depending upon the accurately obtained color features. This method is effective in the case that in all the different cameras the object appears in the front viewing direction. Related document includes M. Farenze et al, "*Person Re-identification by Symmetry-Driven Accumulation of Local Features*" (*IEEE Conference on Computer Vision and Pattern Recognition (CVPR), 2010*) (referred to as related document 1).

SUMMARY

The following presents a simplified summary of the disclosure in order to provide a basic understanding of some aspects of the disclosure. This summary is not an exhaustive overview of the disclosure. It is not intended to identify key or critical elements of the disclosure or to delineate the scope of the disclosure. Its sole purpose is to present some concepts in a simplified form as a prelude to the more detailed description that is discussed later.

According to an aspect of the disclosure, there is provided an object recognizing apparatus. The object recognizing apparatus may include: a viewing direction estimating device configured for respectively estimating a first viewing direction of a first object captured by a first camera and a second viewing direction of a second object captured by a second camera; a feature extracting device configured for extracting one or more features respectively from an image containing the first object captured by the first camera and an image containing the second object captured by the second camera; and an object matching device configured for allocating a weight for each of the one or more features according to the first viewing direction and the second viewing direction, and calculating a similarity between the first object and the second object based on the one or more weighted features, to determine whether the first object and the second object are the same object.

According to another aspect of the disclosure, there is provided an object recognizing method. The object recognizing method may include: estimating respectively a first viewing direction of a first object captured by a first camera and a second viewing direction of a second object captured by a second camera; extracting one or more features respectively from an image containing the first object captured by the first camera and an image containing the second object captured by the second camera; allocating a weight for each of the one or more features according to the first viewing direction and the second viewing direction, and calculating a similarity between the first object and the second object based on the one or more weighted features, to determine whether the first object and the second object are the same object.

According to another aspect of the disclosure, there is provided a surveillance system including a plurality of cameras and at least one object recognizing apparatus. The object recognizing apparatus is configured for recognizing a first object and a second object respectively captured by a first camera and a second camera in the plurality of cameras, and determining whether the first object and the second object are the same object. The object recognizing apparatus may include: a viewing direction estimating device configured for respectively estimating a first viewing direction of the first object and a second viewing direction of the second object; a feature extracting device configured for extracting one or more features respectively from an image containing the first object captured by the first camera and an image containing the second object captured by the second camera; and an object matching device configured for allocating a weight for each of the one or more features according to the first viewing direction and the second viewing direction, and calculating a similarity between the first object and the second object based on the one or more weighted features, to determine whether the first object and the second object are the same object.

In addition, some embodiments of the disclosure further provide computer program for realizing the above method.

Further, some embodiments of the disclosure further provide computer program products in at least the form of computer-readable medium, upon which computer program codes for realizing the above method are recorded.

BRIEF DESCRIPTION OF DRAWINGS

The above and other objects, features and advantages of the embodiments of the disclosure can be better understood with reference to the description given below in conjunction with the accompanying drawings, throughout which identical or like components are denoted by identical or like reference signs. In addition the components shown in the drawings are merely to illustrate the principle of the disclosure. In the drawings.

DETAILED DESCRIPTION

Some embodiments of the present disclosure will be described in conjunction with the accompanying drawings hereinafter. It should be noted that the elements and/or features shown in a drawing or disclosed in an embodiments may be combined with the elements and/or features shown in one or more other drawing or embodiments. It should be further noted that some details regarding some components and/or processes irrelevant to the disclosure or well known in the art are omitted for the sake of clarity and conciseness.

Some embodiments of the disclosure provide method and apparatus for object recognition in a monitoring having a plurality of cameras.

In the embodiments of the disclosure, the object to be detected may be various objects, such as a person, an animal or a vehicle.

Figure 1:
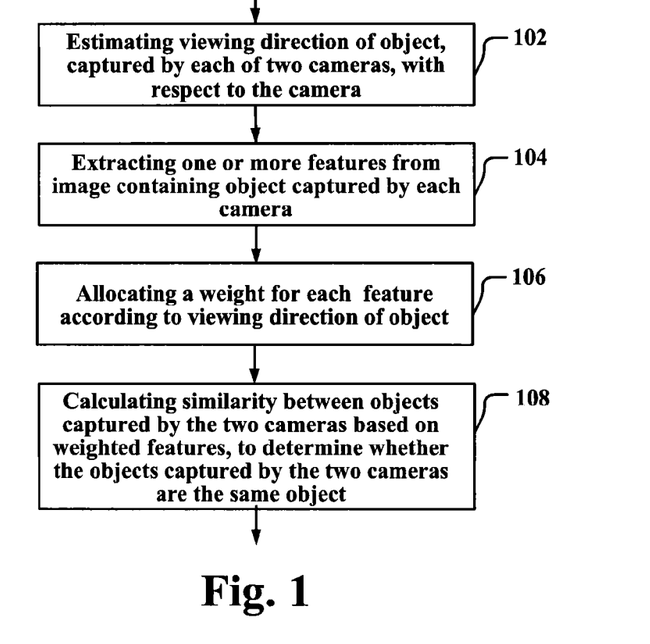
FIG. 1 is a schematic flow chart illustrating an object recognizing method according to an embodiment of the present disclosure.

FIG. 1 is a schematic flow chart illustrating an object recognizing method according to an embodiment of the present disclosure. In the embodiment, different features extracted from images are provided with different weights based on the relationship between the viewing directions of objects, captured by different cameras, with respect to the cameras, and the similarity between the objects captured by the different cameras is estimated based on the weighted features, so as to recognize whether the objects captured by the different cameras are the same object.

As shown in FIG. 1, the method includes steps 102, 104 and 106.

In step 102, the viewing direction of an object captured by a camera with respect to the camera is estimated. In a monitoring network having a plurality of cameras, in order to match the objects captured by two different cameras, the viewing direction of the object captured by each camera with respect to this camera have to be estimated first.

The so called viewing direction of an object with respect to a camera (or the viewing direction of an object in a camera) refers to the viewing angle of the object captured by the camera with respect to the shooting direction of the camera. For example, when the monitored object faces the lens of the camera, the viewing direction of the object with respect to the camera is the front viewing angle; when the monitored object appears with its back towards the lens of the camera, the viewing direction of the object with respect to the camera is the back viewing angle; and when the monitored object appears with its side or top towards the lens of the camera, the viewing direction of the object with respect to the camera is the side viewing angle.

As particular examples, the viewing direction of an object with respect to a camera may be estimated by using the method described below with reference to FIGS. 2-4.

Then, in step 104 one or more features are extracted from the image containing the object captured by each camera. The extracted features may include one or more of a contour feature, a color histogram feature, a feature reflecting ratio between colors of different parts of the object (for example, if the object is a person, the feature may be a ratio between the colors of the upper part and the lower part of the person), a local feature point feature and a local texture feature, and the like. In FIG. 1, step 104 is shown to be executed after step 102. However, it should be appreciated that this step 104 may be executed before step 102, the description of which is not detailed herein.

In step 106 each feature is provided with a weight according to the viewing directions of the objects in the two cameras. Then, in step 108 the similarity between the objects captured by the two cameras is calculated based on the weighted features, so as to determine whether the objects captured by the two cameras are the same object.

It is supposed that A and B represent the image samples captured by two cameras and M ($M \geq 1$) features, i.e. $Ftr_1$, $Ftr_2$, ..., $Ftr_M$, are extracted from each of the two samples, then the features extracted from both of the samples may be represented by $Ftr_1^A$, $Ftr_2^A$, ..., $Ftr_M^A$, and $Ftr_1^B$, $Ftr_2^B$, ..., $Ftr_M^B$, respectively.

The method of providing different weights to different features will be described below with the viewing direction of an object in cameras being Front (F), Back (B) and Side (S) as an example. In the example, there are six possible combinations of relationship between the viewing directions of the objects in different cameras, including:

1) F-F (Front to Front);
2) B-B (Back to Back);
3) S-S (Side to Side);
4) F-B (Front to Back);
5) F-S (Front to Side); and
6) B-S (Back to Side).

As a particular embodiment, the weight provided for each feature may reflect the relationship between the viewing directions of the objects captured by two cameras and the effectiveness of the feature for object matching in the viewing directions. Particularly, the higher the effectiveness of a feature for object matching in the viewing direction is, the larger the weight provided for the feature is; and the lower the effectiveness of a feature for object matching in the viewing direction is, the smaller the weight provided for the feature is.

For the above six relationship of viewing directions, i.e. F-F, B-B, S-S, F-B, B-S, and F-S, different sets of weights, i.e. $W^{F-F}$, $W^{B-B}$, $W^{S-S}$, $W^{F-B}$, $W^{B-S}$, and $W^{F-S}$, for different features may be selected according to the relationship between the features and the different viewing directions as follows:

$$W^{F-F} = \{w_1, w_2, \ldots, w_M\}^{F-F}$$

$$W^{B-B} = \{w_1, w_2, \ldots, w_M\}^{B-B}$$

$$W^{S-S} = \{w_1, w_2, \ldots, w_M\}^{S-S}$$

$$W^{F-B} = \{w_1, w_2, \ldots, w_M\}^{F-B}$$

$$W^{B-S} = \{w_1, w_2, \ldots, w_M\}^{B-S}$$

$$W^{F-S} = \{w_1, w_2, \ldots, w_M\}^{F-S}$$

Wherein M represents the number of features extracted from each image sample, and $w_1, w_2, \ldots, w_M$ represents the weights for the features $Ftr_1, Ftr_2, \ldots, Ftr_M$, respectively.

As a particular example, it is supposed that the object to be detected is a person and that 3 features (i.e. M=3) including a color histogram feature (Ftr$_1$), a ratio feature between upper and lower parts (Ftr$_2$), and a local feature point feature (Ftr$_3$) are employed.

The inventor of the disclosure found that the color histogram feature and the ratio feature between upper and lower parts are effective for the object matching under the viewing direction relationships of F-F (Front-to-Front) and B-B (Back to Back). Thus, in the set of weights $W^{F-F}$ and $W^{B-B}$, the weights $w_1$ and $w_2$ for the color histogram feature and the ratio feature between upper and lower parts may be set large, while the weight $w_3$ for the local feature point feature (Ftr$_3$) may be set small. As particular examples, the weights may be set as follows: $w_1=w_2=0.4$, $w_3=0.2$.

In addition, the local feature point feature is relatively effective for the object matching under the viewing direction relationship S-S (Side to Side). Thus, in the set of weights $W^{S-S}$, the weight $w_3$, may be set larger, while the weights $w_1$ and $w_2$ may be set small. As particular examples, the weights may be set as follows: $w_1=w_2=0.2$, $w_3=0.6$.

In addition, the ratio feature between upper and lower parts is relatively effective for the object matching under the viewing direction relationship F-B (Front to Back). Thus in the set of weights $W^{F-B}$, the weight $w_2$ may be set large, while the weights $w_1$ and $w_3$ may be set small. As particular examples, the weights may be set as follows: $w_1=w_3=0.2$, $w_2=0.6$ In addition, the ratio feature between upper and lower parts and the local feature point feature are relatively effective for the object matching under the viewing direction relationships F-S (Front to Side) and B-S (Back to Side). Thus in the sets of weights $W^{F-S}$和 $W^{B-S}$中, the weights $w_2$ and $w_3$ may be set large, while the weight $w_1$ may be set small. As particular examples, the weights may be set as follows: $w_2=w_3=0.2$, $w_1=0.6$.

It should be noted that the particular features and the particular values of weights in the above examples are merely illustrative, and should not be considered as a limitation of the disclosure. In practice, the features and the corresponding weights may be selected based on the object to be detected and the particular application scenarios. The disclosure is not limited to the above particular features and values described in the above embodiments and examples.

After weighting each feature, the similarity between the objects captured by the two cameras may be calculated by using the weighted features, to determine whether the two are the same object.

As an example, the similarity between the objects captured by the two cameras may be calculated by using the following formula:

$$D = \sum_{i=1}^{M} w_i \cdot d(Ftr_i^A, Ftr_i^B) \quad (1)$$

In the above formula D represents the similarity between the objects captured by the two cameras; $d(Ftr_i^A, Ftr_i^B)$ represents the similarity between the features, that are belong to the same type, extracted from the image samples captured by the two cameras. The similarity between features may be calculated based on the type of the feature by using any appropriate method.

As an example, Bhattacharyya distance may be used to calculate the similarity between color histogram features:

$$d(H^A, H^B) = \sqrt{1 - \sum_i \sqrt{H^A(i) \cdot H^B(i)}} \quad (2)$$

As another example, $\chi^2$ distance may be used to calculate the similarity between color histogram features:

$$d(H^A, H^B) = \sum_i \frac{H^A(i) - H^B(i)}{H^A(i) + H^B(i)} \quad (3)$$

In the above formula (2) or (3), $H^A, H^B$ represent the color histogram features extracted from the image samples A and B captured by the two cameras, respectively; $d(H^A, H^B)$ represents the similarity between the color histogram features $H^A, H^B$; i represents the index of bins in the color histogram feature. For example, HA(i) represents the value of ith bin in the color histogram feature.

As an example, the distance between the ratio features of upper and lower parts may be calculated by using the following formula:

$$d(CR^A, CR^B) = \exp\left|\log \frac{CR^A}{CR^B}\right| - 1 \quad (4)$$

In the above formula, $$CR = \frac{Color^{Top}}{Color^{Bottom}}$$

represents the ratio between the upper and lower parts, $Color^{Top}, Color^{Bottom}$ represent the colors of the upper and lower parts, respectively . . . $CR^A, CR^B$ represent the ratio features between the upper and lower parts extracted from the image samples A and B captured by the two cameras, respectively, and $d(CR^A, H^B)$ represents the similarity between $CR^A, CR^B$.

As an example, the distance between the local feature point features may be calculated by using the following formula:

$$d(PS^A, PS^B) = \frac{\text{Match}(PS^A, PS^B)}{Num(PS^A) + Num(PS^B)} \quad (5)$$

In the above formula, $PS^A, PS^B$ represent the local feature point features extracted from the image samples A and B captured by the two cameras, respectively, $d(PS^A, PS^B)$ represents the similarity between $PS^A, PS^B$. Match($PS^A, PS^B$) represents the number of matched feature points, and Num(PS) represents the number of feature points.

It should be noted that any appropriate method may be used to calculate the similarity of features that belong to the same type, extracted from the image samples captured by two cameras, and is not numerated herein for conciseness.

After calculating the similarity between the objects captured by the two cameras, it is judged whether the objects are the same object based on the similarity. For example, it may be judged whether the similarity is larger than a predetermined threshold value, and if yes, it may be determined that the objects captured by the two cameras match with each other and are the same object, otherwise, it may be determined that the objects captured by the two cameras do not match with each other and are not the same object.

As an example, in the case that there are multiple objects in the images captured by two cameras, an object (referred to the first object) captured by a camera (referred to the first camera) may be matched with each of multiple objects (referred to multiple second objects) captured the other camera (referred to the second camera) one by one by using the above method. The second object, which similarity to the first object is highest, among the multiple second objects may be selected. The second object with highest similarity may be an object matched with the first object. Or, it may be further judged on whether the similarity between this second object and the first object is larger than a predetermined threshold value, and if yes, this second object may be determined as an object matched with the first object, otherwise, it is determined that there is no object that matches with the first object in the image captured by the second camera.

In the method shown in FIG. 1, different features are provided with different weights based on the relationship between viewing directions of objects, captured by different cameras, with respect to the cameras and the effectiveness of the features for the object recognition under the relationship between the viewing directions. The similarity between objects estimated by using such weighted features is more precise and thus may improve the accuracy of object recognition. By using the method, the affect of the difference between backgrounds of images and the different viewing directions of the objects in different cameras on the object recognition may be decreased.

Examples of a method of estimating a viewing direction of an object, captured by a camera, with respect to the camera are described below with reference to FIGS. 2-4.

Figure 2:
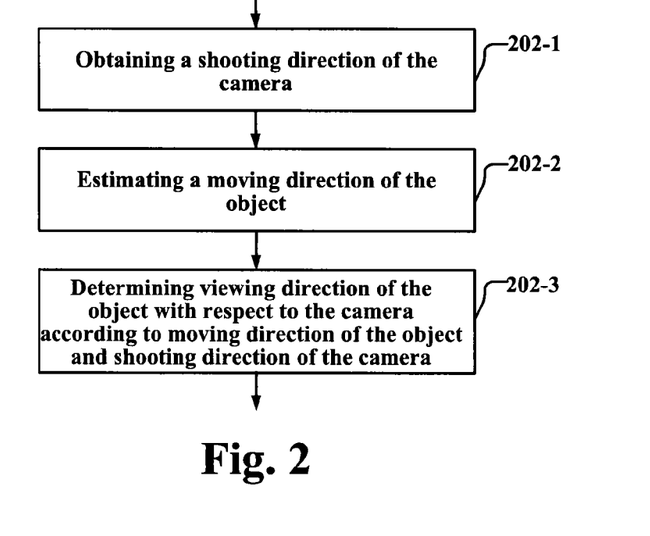
FIG. 2 is a schematic flow chart illustrating an example of a method of estimating a viewing direction of an object with respect to a camera.
Figure 3:
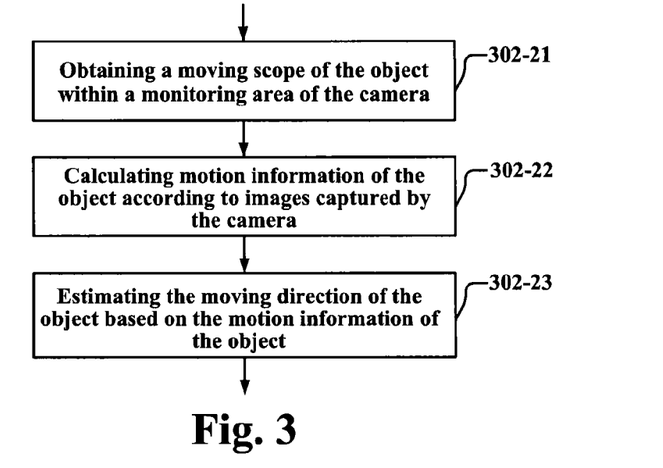
FIG. 3 is a schematic flow chart illustrating an example of a method of estimating a moving direction of an object.

FIG. 2 illustrates an example of a method of estimating a viewing direction of an object, captured by a camera, with respect to the camera. In the example, the viewing direction of an object with respect to the camera is estimated by using the relationship between the moving direction of the object and the shooting direction of the camera.

As shown in FIG. 2, in step 202-1 the configuration information of the camera is obtained first. The configuration information of the camera may be acquired from the monitoring network (e.g. from a storage device for storing system information of the monitoring system) and may include the shooting direction of the camera, and may further include the position of the camera and the like.

Then, in step 202-2 the moving direction of the object may be estimated based on the images captured by the camera.

Any appropriate method may be used to estimate the moving direction of the object in the images. FIG. 3 illustrates an example of a method of estimating the moving direction of the object. As shown in FIG. 3, in step 302-21 the moving scope of the object in the monitoring area of the camera, i.e. the possible moving scope of the object, is obtained first. The possible moving scope of the object may be acquired by using any appropriate method, the description of which is omitted herein. Then, in step 302-22 the moving information of the object is calculated based on the images captured by the camera. The moving information of the object may be calculated by using any appropriate method, such as the motion vector method, the optical flow estimation method, the motion history information method, or any other appropriate method. The related documents involving the motion vector method includes, for example, Bak S., Corvee E., Brémond F., Thonnat M. et al, "*Person Re-identification Using Haar-based and DCD-based Signature*" (AVSS, 2010) (referred to as related document 2). The related documents involving the optical flow estimation method includes, for example, H.264/MPEG-4 AVC, ISO/IEC 14496-10. The related documents involving the motion history information method includes, for example, David J. Fleet, and Yair Weiss, "*Optical Flow Estimation*" (*Handbook of Mathematical Models in Computer Vision,* 2006) (referred to as related document 3). The description of the methods is not detailed herein. In step 302-23 the moving direction of the object is estimated based on the motion information of the object. Estimating the moving direction of the object based on the motion information of the object is an estimation of the main direction of the motion information of the object. As an example, a principal component analysis method may be used to estimate the moving direction, related documents include, for example, Jolliffe I. T. "*Principal Component Analysis, Series: Springer Series in Statistics*" ($2^{nd}$ Version, Springer, New York, 2002) (referred to as related document 4). As another example, a voting method may be used to estimate the moving direction. Particularly, a statistic may be done to all the moving directions in the motion information, and the direction with the largest number of appearance may be considered the main direction, i.e. the moving direction of the object.

As an example, the shooting direction of a camera may be expressed by the angle CAM_D between the shooting direction of the lens of the camera and a certain reference direction, wherein $0°\leq CAM\_D \leq 360°$. The reference direction may be any direction selected based on the practical application and is not limited to any particular direction example. Likewise, the estimated moving direction may be expressed by using an angle OBJ_D with respect to the reference direction, wherein $0°\leq OBJ\_D \leq 360°$.

Then, in step 203-3, the viewing direction of the object in the camera is determined based on the moving direction of the object and the shooting direction of the camera. That is, the viewing direction of the object in the camera is determined based on the relationship between the shooting direction (CAM_D) of the camera and the moving direction (OBJ_D) of the object. As a particular example, when the shooting direction of the camera and the moving direction of the object are opposite to each other, the object is in a front viewing direction; when the two directions are the same, the object is in a back viewing direction; and when the two direction are perpendicular to each other (at this time the side or the top of the object faces the lens of the camera), the object is in a side viewing direction. Of course, in practice the viewing direction of an object in a camera is not limited to the above listed examples. As an example, the viewing direction of the object may be refined according to the position of the camera as well as the shooting direction of the camera and the moving direction of the object. For instance, when the camera is located above the monitoring area, the object is in a looking down viewing direction, the description of which is not detailed herein.

Figure 4:
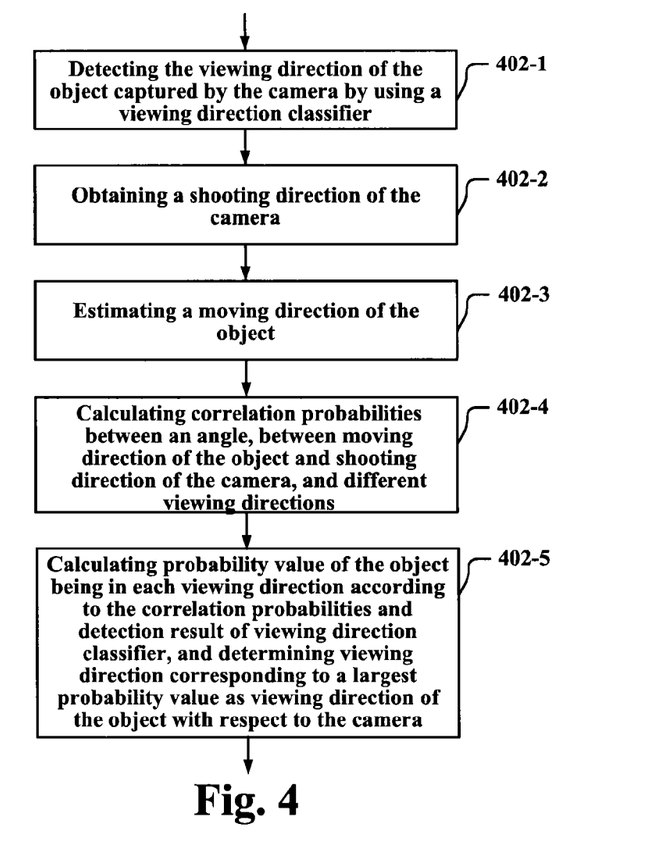
FIG. 4 is a schematic flow chart illustrating another example of a method of estimating a viewing direction of an object with respect to a camera.

FIG. 4 shows another example of estimating a viewing direction of an object, captured by a camera, with respect to the camera. In the example, the viewing direction of an object in an image is detected by using a viewing direction classifier obtained by training.

As shown in FIG. 4, in step 402-1 the viewing direction of an object in the images captured by a camera is detected by using a viewing direction classifier, thus obtaining a detection result from the viewing direction classifier.

The viewing direction classifier is a classifier obtained by training a plurality of training samples and capable of detecting the viewing direction of an object in an image. For conciseness, it is supposed that the trained viewing direction classifier can detect 2 viewing directions of an object, including the front viewing direction (F), the back viewing direction (B) and the side viewing direction (S). The viewing direction classifier processes an image containing the object and may outputs a result as follows:

$$\begin{cases} P(x|F) \\ P(x|B) \\ P(x|S) \end{cases} \quad (6)$$

In other words, the detection result of the viewing direction classifier may include the probability value of each viewing direction detected by it. P(x|F) represents the probability value that the object is in the front viewing direction, P(x|B) represents the probability value that the object is in the back viewing direction, and P(x|S) represents the probability value that the object is in the side viewing direction.

Then, in step 402-2 the configuration information of the camera is acquired. The configuration information may include the shooting direction of the camera, and may also include the position of the camera and other information of the camera. In step 402-3 the moving direction of the object is estimated. Step 402-2 is similar to step 202-1 and the description thereof is not repeated herein. Step 402-3 is similar to step 202-2, for example, the method shown in FIG. 3 may be used to estimate the moving direction of the object, the description of which is not repeated herein.

Then, in step 402-4 the correlation probabilities between the angle, between the moving direction of the object and the shooting direction of the camera, and the different viewing directions are calculated.

It is supposed that the angle between the moving direction of the object and the shooting direction of the camera is θ, θ=|OBJ_D−CAM_D|. Using the above 3 viewing directions as examples, the correlation probabilities between the angle θ and the 3 viewing directions may be calculated by using the following formula, respectively:

$$\begin{cases} p_{front}(\theta) = \cos(\theta - 180°) \\ p_{back}(\theta) = \cos(\theta - 90°) \\ p_{side}(\theta) = \cos(\theta) \end{cases} \quad (7)$$

$p_{front}(\theta)$ represents the correlation probability between the angle θ and the front viewing direction, $p_{back}(\theta)$ represents the correlation probability between the angle θ and the back viewing direction, and $p_{side}(\theta)$ represents the correlation probability between the angle θ and the side viewing direction.

Then, in step 402-5 the probabilities that the object being in each of the different viewing directions are calculated by using the above correlation probabilities and the detection result of the viewing direction classifier. The viewing direction corresponding to the largest probability value may be considered as the viewing direction of the object in the camera.

As a particular example, the probabilities that the object being in each of the different viewing directions may be calculated by using the following formula, respectively:

$$P(x) = \begin{cases} P(x|F) \cdot p_{front}(\theta) \\ P(x|B) \cdot p_{back}(\theta) \\ P(x|S) \cdot p_{side}(\theta) \end{cases} \quad (8)$$

In other words, the correlation probability between the angle θ and each of the plurality of viewing directions may be multiplied by the probability value that the object being in the each viewing direction detected by the viewing direction classifier, so as to obtain a plurality of product values, each of which corresponds to one of the plurality of viewing directions. The viewing direction corresponding to the largest product valued may be considered as the viewing direction of the object with respect to the camera.

It should be noted that other appropriate method may be used to estimate the viewing direction of the object with respect to the camera and the disclosure is not limited to the above examples.

Figure 5:
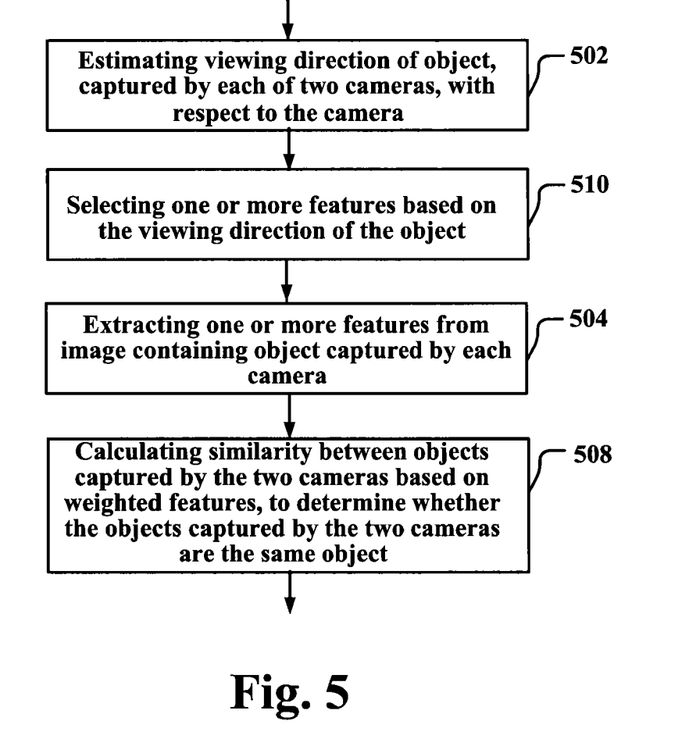
FIG. 5 is a schematic flow chart illustrating an object recognizing method according to a particular embodiment of the disclosure.

FIG. 5 illustrates a modification of the method shown in FIG. 1.

As shown in FIG. 5, the method includes steps 502, 510, 504, and 508. Steps 502, 504, and 508 are similar to steps 102, 104, and 108, respectively, the description of which is not repeated. The difference lies in step 510, in which one or more features are selected according to the relationship between the viewing directions of the objects captured by different cameras, as well as the effectiveness of different features for object recognition under the relationship of viewing directions. The selected features are used in the following step of calculating the similarity between objects. In a sense, step 510 is a modification of step 106. That is, based on the effectiveness of different features for object recognition, the weight provided to a feature with high effectiveness is set as 1, while the weight provided to a feature with low effectiveness is set as 0.

Step 510 may be executed before step 504, and thus in this case, only the selected features are extracted in step 504.

As another example, the method as shown in FIG. 5 may further include a step of providing weights for one or more selected features based on the relationship between viewing direction of objects, captured by different cameras, with respect to the cameras as well as the effectiveness of different features for object recognition under the relationship between the viewing directions, the description of which is not repeated herein.

The object recognizing apparatus according to embodiments of the disclosure is described below with reference to FIGS. 6-7.

Figure 6:
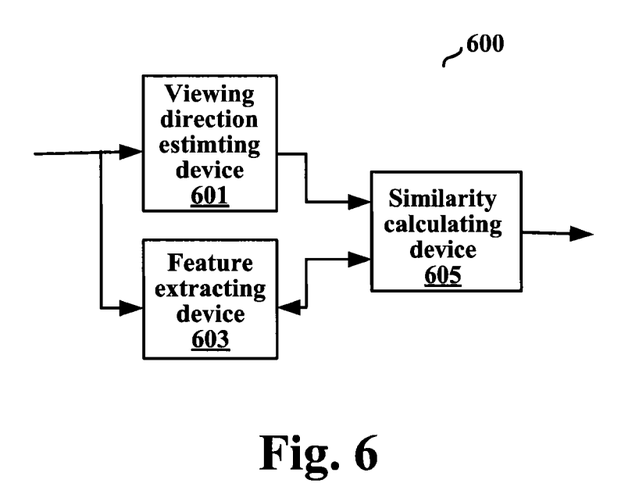
FIG. 6 is a schematic block diagram illustrating the structure of an object recognizing apparatus according to an embodiment of the present disclosure.

FIG. 6 is a schematic block diagram illustrating the structure of an object recognizing apparatus according to an embodiment of the present disclosure. In the embodiment, different features extracted from images are provided with different weights based on the relationship between the viewing directions of objects, captured by different cameras, with respect to the cameras, and the similarity between the objects captured by the different cameras is estimated based on the weighted features, so as to recognize whether the objects captured by the different cameras are the same object.

As shown in FIG. 6 the apparatus 600 includes a viewing direction estimating device 601, a feature extracting device 603 and a similarity calculating device 605.

The viewing direction estimating device 601 is configured to estimate the viewing direction of an object, captured by a camera in the monitoring network, with respect to the camera. In order to match the objects captured by two different cameras, the viewing direction estimating device 601 is required to estimate the viewing direction of the object, captured by each camera of two cameras, with respect to the each camera. Similar to the above method embodiments or examples, the so called viewing direction of an object with respect to a camera (or the viewing direction of an object in a camera) refers to the viewing angle of the object captured by the camera with respect to the shooting direction of the camera. For example, when the monitored object faces the lens of the camera, the viewing direction of the object with respect to the camera is the front viewing angle; when the monitored object appears with its back towards the lens of the camera, the viewing direction of the object with respect to the camera is the back viewing angle; and when the monitored object appears with its side or top towards the lens of the camera, the viewing direction of the object with respect to the camera is the side viewing angle. As particular examples, the viewing direction estimating device 601 may use the method described above with reference to FIGS. 2-4 to estimate the viewing direction of the object with respect to the camera, the description of which is not repeated.

The feature extracting device 603 is configured to extract one or more features from the image containing the object captured by each camera. The extracted features may include one or more of a contour feature, a color histogram feature, a feature reflecting ratio between colors of different parts of the object (for example, if the object is a person, the feature may be a ratio between the colors of the upper part and the lower part of the person), a local feature point feature and a local texture feature, and the like.

The similarity calculating device 605 is configured to allocate a weight to each feature according to the viewing directions of the objects captured by the two cameras and calculated the similarity between the objects captured by the two cameras by using the weighted features, so as to determine whether the objects captured by the two cameras are the same object or not.

The similarity calculating device 605 may use the method described in the above method embodiments or examples to provide the weight for each feature, the description of which is not repeated. As a particular embodiment, the weight provided for each feature may reflect the relationship between the viewing directions of the objects captured by the two cameras and the effectiveness of the feature for object matching in the viewing directions. Particularly, the higher the effectiveness of a feature for object matching in the viewing direction is, the larger the weight provided for the feature is; and the lower the effectiveness of a feature for object matching in the viewing direction is, the smaller the weight provided for the feature is.

The similarity calculating device 605 may use the method described in the above method embodiments or examples to calculate the similarity between the objects captured by the two cameras by using the weighted features, the description of which is not repeated. After calculating the similarity between the objects captured by the two cameras, the similarity calculating device 605 may determine whether the objects captured by the two cameras are the same object or not based on the value of the similarity. For example, the similarity calculating device 605 may judge whether value of the similarity between the objects is larger than a predetermined threshold value, and if yes, determine that the objects match with each other and thus are the same object, otherwise, determine that the objects do not match with each other and thus are not the same object.

In the apparatus shown in FIG. 6, different features are provided with different weights based on the relationship between viewing directions of objects, captured by different cameras, with respect to the cameras and the effectiveness of the features for the object recognition under the relationship between the viewing directions. The similarity between objects estimated by using such weighted features is more precise and thus may improve the accuracy of object recognition. By using the method, the affect of the difference between backgrounds of images and the different viewing directions of the objects in different cameras on the object recognition may be decreased.

Figure 7:
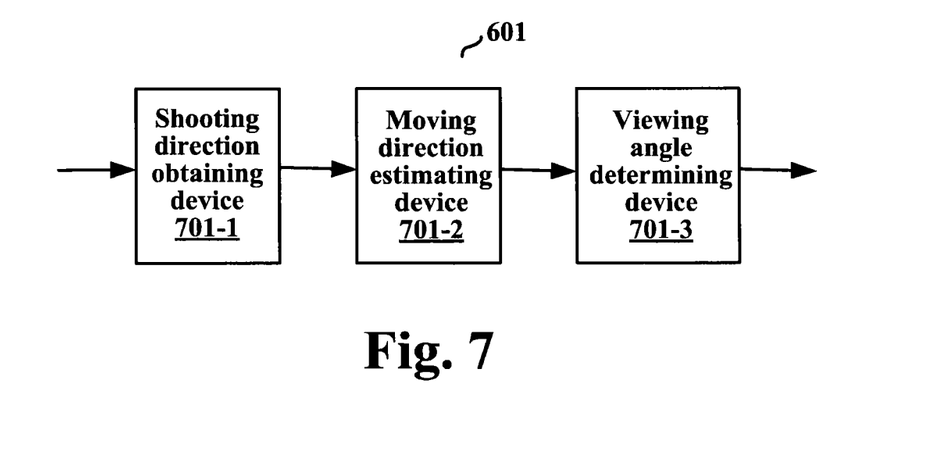
FIG. 7 is a schematic block diagram illustrating an example of the structure of the viewing direction estimating device shown in FIG. 6.

FIG. 7 shows an example of the structure of the viewing direction estimating device 601 shown in FIG. 6.

As shown in FIG. 7, the viewing direction estimating device 601 may include a shooting direction obtaining device 701-1, a moving direction estimating device 701-2 and a viewing angle determining device 701-3.

The shooting direction obtaining device 701-1 is configured to obtain the configuration information of a camera. The configuration information of a camera may include the shooting direction of the camera, and may further include the position of the camera and the like. The shooting direction obtaining device 701-1 may obtain the configuration information of a camera by using the method described above with reference to step 202-1, the description of which is not repeated.

The moving direction estimating device 701-2 is configured to estimate the moving direction of an object based on the images captured by the camera. The moving direction estimating device 701-2 may estimate the moving direction of an object by using the method described above with reference to step 202-2 or the method shown in FIG. 3, the description of which is not repeated.

The viewing angle determining device 701-3 is configured to determine the viewing direction of the object based on the moving direction of the object and the shooting direction of the camera. For example, when the shooting direction of the camera and the moving direction of the object are opposite to each other, the viewing angle determining device may determine that the object is in a front viewing direction; when the shooting direction of the camera and the moving direction of the object are the same, the viewing angle determining device may determine that the object is in a back viewing direction; and when the shooting direction of the camera and the moving direction of the object are perpendicular to each other, the viewing angle determining device may determine that the object is in a side viewing direction.

Figure 8:
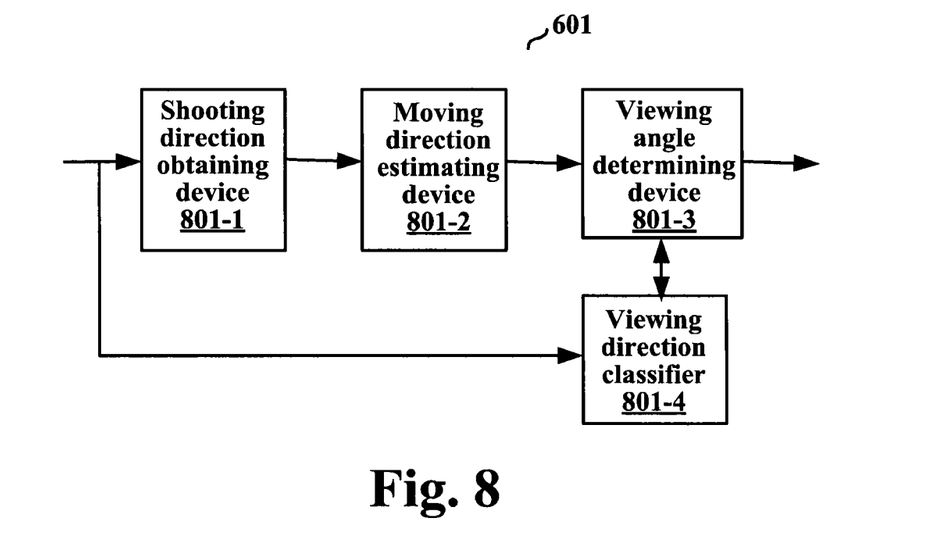
FIG. 8 is a schematic block diagram illustrating another example of the structure of the viewing direction estimating device shown in FIG. 6.

FIG. 8 shows another example of the structure of the viewing direction estimating device 601 shown in FIG. 6.

As shown in FIG. 8, in addition to the shooting direction obtaining device 801-1, the moving direction estimating device 801-2 and the viewing angle determining device 801-3, the viewing direction estimating device 601 may further include a viewing direction classifier 801-4.

The viewing direction classifier 801-4 is similar to the viewing direction classifier descried above with reference to FIG. 4, the description of which is not repeated.

The shooting direction obtaining device 801-1 and the moving direction estimating device 801-2 are similar to the shooting direction obtaining device 701-1 and the moving direction estimating device 701-2, respectively, the description of which is not repeated.

The viewing angle determining device 801-3 is configured to determine the viewing direction of the object with respect to the camera. Particularly, the viewing angle determining device 801-3 may calculate the correlation probabilities between the angle, between the moving direction of the object and the shooting direction of the camera, and the different viewing directions, calculate the probability values of the object being in different viewing directions by using the calculated correlation probabilities and the detection result of the viewing direction classifier, and determines the viewing direction corresponding to the largest probability value as the viewing direction of the object in the camera. The viewing angle determining device 801-3 may determine the viewing direction of the object in the camera by using the method described above with reference to steps 402-4 and 402-5, the description of which is not repeated.

As a modification of the embodiment shown in FIG. 6, the similarity calculating device 605 may select one or more features according to the relationship between the viewing directions of the objects captured by different cameras, as well as the effectiveness of different features for object recognition under the relationship of viewing directions. The selected features are used in the following calculation of the similarity between objects. In a sense, this is a modification of step 106. That is, based on the effectiveness of different features for object recognition, the weight provided to a feature with high effectiveness is set as 1, while the weight provided to a feature with low effectiveness is set as 0.

As an example, the similarity calculating device 605 may notify the selected features to the feature extracting device 603, so that the feature extracting device 603 extracts only the selected one or more features.

As another example, the similarity calculating device 605 may further provides weights for the one or more selected features based on the relationship between viewing direction of objects, captured by different cameras, with respect to the cameras as well as the effectiveness of different features for object recognition under the relationship between the viewing directions, the description of which is not repeated herein.

The method and apparatus according to embodiments of the disclosure may be applied to any location with a monitoring apparatus (including a plurality of cameras), such as airports, communities, banks, parks, and military bases, and the like.

It should be understood that the above embodiments and examples are illustrative, rather than exhaustive. The present disclosure should not be regarded as being limited to any particular embodiments or examples stated above.

In the above embodiments and examples, numerical symbols are used to represent the steps or modules. As can be appreciated by those skilled in the art, these numerical symbols are merely used to distinguish the steps and modules literally, and should not be considered as a limitation to the order or others.

In addition, the method as shown in the above embodiments and examples is not necessarily to be executed in the shown order. For example, in the embodiment shown in FIG. 1 step 106 is shown to be executed after step 104. However, in other embodiment step 106 may be executed before step 104. For instance, the method may be executed in the order of steps 104, step 102, and step 106, the description of which is not detailed herein.

Figure 9:
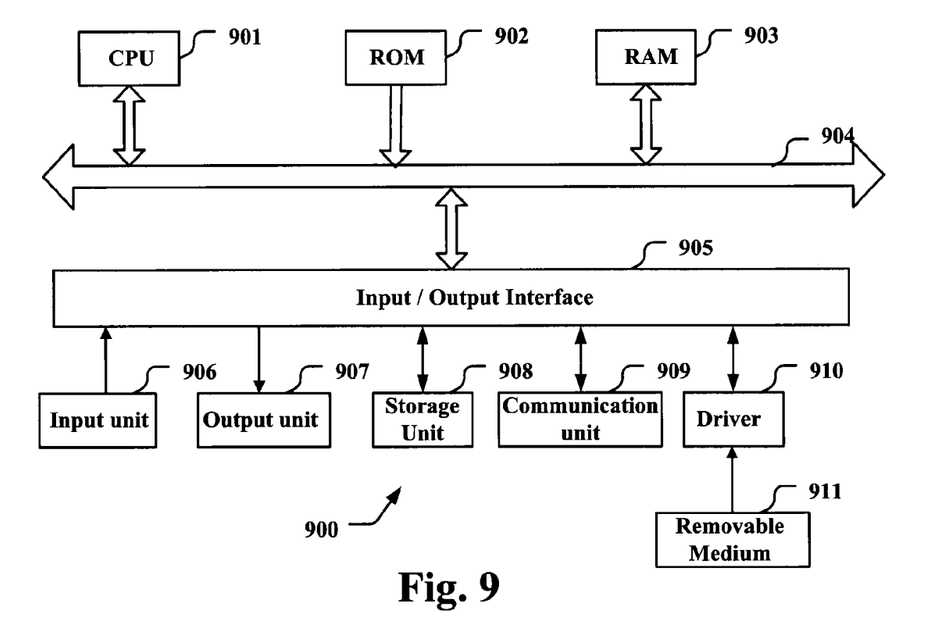
FIG. 9 is a schematic block diagram illustrating the structure of computer for realizing the embodiments or examples of the disclosure.

As an example, the components, units or steps in the above apparatuses and methods can be configured with software, hardware, firmware or any combination thereof. As an example, in the case of using software or firmware, programs constituting the software for realizing the above method or apparatus can be installed to a computer with a specialized hardware structure (e.g. the general purposed computer 900 as shown in FIG. 9) from a storage medium or a network. The computer, when installed with various programs, is capable of carrying out various functions.

In FIG. 9, a central processing unit (CPU) 901 executes various types of processing in accordance with programs stored in a read-only memory (ROM) 902, or programs loaded from a storage unit 908 into a random access memory (RAM) 903. The RAM 903 also stores the data required for the CPU 901 to execute various types of processing, as required. The CPU 901, the ROM 902, and the RAM 903 are connected to one another through a bus 904. The bus 904 is also connected to an input/output interface 905.

The input/output interface 905 is connected to an input unit 906 composed of a keyboard, a mouse, etc., an output unit 907 composed of a cathode ray tube or a liquid crystal display, a speaker, etc., the storage unit 908, which includes a hard disk, and a communication unit 909 composed of a modem, a terminal adapter, etc. The communication unit 909 performs communicating processing. A drive 910 is connected to the input/output interface 905, if needed. In the drive 910, for example, removable media 911 is loaded as a recording medium containing a program of the present invention. The program is read from the removable media 911 and is installed into the storage unit 908, as required.

In the case of using software to realize the above consecutive processing, the programs constituting the software may be installed from a network such as Internet or a storage medium such as the removable media 911.

Those skilled in the art should understand the storage medium is not limited to the removable media 911, such as, a magnetic disk (including flexible disc), an optical disc (including compact-disc ROM (CD-ROM) and digital versatile disk (DVD)), an magneto-optical disc (including an MD (Mini-Disc) (registered trademark)), or a semiconductor memory, in which the program is recorded and which are distributed to deliver the program to the user aside from a main body of a device, or the ROM 902 or the hard disc involved in the storage unit 908, where the program is recorded and which are previously mounted on the main body of the device and delivered to the user.

The present disclosure further provides a program product having machine-readable instruction codes which, when being executed, may carry out the methods according to the embodiments.

Accordingly, the storage medium for bearing the program product having the machine-readable instruction codes is also included in the disclosure. The storage medium includes but not limited to a flexible disk, an optical disc, a magneto-optical disc, a storage card, or a memory stick, or the like.

In the above description of the embodiments, features described or shown with respect to one embodiment may be used in one or more other embodiments in a similar or same manner, or may be combined with the features of the other embodiments, or may be used to replace the features of the other embodiments.

As used herein, the terms the terms "comprise," "include," "have" and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

Further, in the disclosure the methods are not limited to a process performed in temporal sequence according to the order described therein, instead, they can be executed in other temporal sequence, or be executed in parallel or separatively. That is, the executing orders described above should not be regarded as limiting the method thereto.

While some embodiments and examples have been disclosed above, it should be noted that these embodiments and examples are only used to illustrate the present disclosure but not to limit the present disclosure. Various modifications, improvements and equivalents can be made by those skilled in the art without departing from the scope of the present disclosure. Such modifications, improvements and equivalents should also be regarded as being covered by the protection scope of the present disclosure.

What is claimed is:

1. An object recognizing apparatus, comprising:
a viewing direction estimating device that respectively estimates a first viewing direction of a first object captured by a first camera and a second viewing direction of a second object captured by a second camera;
a feature extracting device that extracts one or more features respectively from an image containing the first object captured by the first camera and an image containing the second object captured by the second camera; and
an object matching device that allocates a weight for each of the one or more features according to the first viewing direction and the second viewing direction, and calculates a similarity between the first object and the second object based on the one or more weighted features, to determine whether the first object and the second object are a same object, wherein:
the weight for each of the one or more features reflects a relationship between the first and second viewing directions and effectiveness of the one or more features for object recognition under the first and second viewing directions;
the viewing direction estimating device includes:
a shooting direction obtaining device that obtains a shooting direction of a camera;
a moving direction estimating device that estimates a moving direction of an object based on images captured by the camera; and
a viewing angle determining device that determines a viewing direction of the object with respect to the camera according to the moving direction of the object and the shooting direction of the camera;
when the moving direction of the object and the shooting direction of the camera are opposite to each other, the viewing angle determining device determines that the viewing direction of the object with respect to the camera is a front viewing direction;
when the moving direction of the object and the shooting direction of the camera are the same, the viewing angle determining device determines that the viewing direction of the object with respect to the camera is a back viewing direction; and
when the moving direction of the object and the shooting direction of the camera are perpendicular to each other, the viewing angle determining device determines that the viewing direction of the object with respect to the camera is a side viewing direction.

2. The object recognizing apparatus of claim 1, wherein the one or more features include one or more of:
a contour feature, a color histogram feature, a feature reflecting ratio between colors of different parts of an object, a local feature point feature and a local texture feature.

3. The object recognizing apparatus of claim 1, wherein an estimation of the moving direction of the object includes:
obtain, by the moving direction estimating device, a moving scope of the object within a monitoring area of the camera;
calculate, by the moving direction estimating device, motion information of the object according to images captured by the camera; and
estimate, by the moving direction estimating device, the moving direction of the object based on the motion information of the object.

4. The object recognizing apparatus of claim 1, wherein the similarity calculating device selects one or more features for calculation of the similarity between the first object and the second object based on the first viewing direction and the second viewing direction.

5. An object recognizing method, comprising:
estimating a first viewing direction of a first object captured by a first camera and a second viewing direction of a second object captured by a second camera, respectively;
extracting one or more features respectively from an image containing the first object captured by the first camera and an image containing the second object captured by the second camera;
allocating a weight for each of the one or more features according to the first viewing direction and the second viewing direction; and
calculating a similarity between the first object and the second object based on the one or more weighted features, to determine whether the first object and the second object are a same object, wherein:
the weight for each of the one or more features reflects a relationship between the first and second viewing directions and effectiveness of the one or more features for object recognition under the first and second viewing directions;
estimating a viewing direction of an object with respect to a camera capturing the object includes:
obtaining a shooting direction of the camera;
estimating a moving direction of the object based on images captured by the camera; and
determining the viewing direction of the object with respect to the camera according to the moving direction of the object and the shooting direction of the camera; and
determining a viewing direction of an object with respect to the camera according to the moving direction of the object and the shooting direction of the camera includes:
when the moving direction of the object and the shooting direction of the camera are opposite to each other, determining that the viewing direction of the object with respect to the camera is a front viewing direction;
when the moving direction of the object and the shooting direction of the camera are the same, determining that the viewing direction of the object with respect to the camera is a back viewing direction; and
when the moving direction of the object and the shooting direction of the camera are perpendicular to each other, determining that the viewing direction of the object with respect to the camera is a side viewing direction.

6. The object recognizing method of claim 5, wherein the one or more features include one or more of:
a contour feature, a color histogram feature, a feature reflecting ratio between colors of different parts of an object, a local feature point feature and a local texture feature.

7. The object recognizing method of claim 5, wherein estimating the moving direction of the object includes:
obtaining a moving scope of the object within a monitoring area of the camera;
calculating motion information of the object according to images captured by the camera; and estimating the moving direction of the object based on the motion information of the object.

8. The object recognizing method of claim 5, further comprising:
selecting one or more features for calculation of the similarity between the first object and the second object based on the first viewing direction and the second viewing direction.

9. A surveillance system, comprising:
a plurality of cameras; and
at least one object recognizing apparatus that recognizes a first object and a second object respectively captured by a first camera and a second camera in the plurality of cameras, and determines whether the first object and the second object are a same object, wherein the object recognizing apparatus includes:
a viewing direction estimating device that respectively estimates a first viewing direction of the first object and a second viewing direction of the second object;
a feature extracting device that extracts one or more features respectively from an image containing the first object captured by the first camera and an image containing the second object captured by the second camera; and
an object matching device that allocates a weight for each of the one or more features according to the first viewing direction and the second viewing direction, and calculates a similarity between the first object and the second object based on the one or more weighted features, to determine whether the first object and the second object are a same object, wherein
the weight for each of the one or more features reflects a relationship between the first and second viewing directions and effectiveness of the one or more features for object recognition under the first and second viewing directions;
the viewing direction estimating device includes:
a shooting direction obtaining device that obtains a shooting direction of a camera;
a moving direction estimating device that estimates a moving direction of an object based on images captured by the camera; and
a viewing angle determining device that determines a viewing direction of the object with respect to the camera according to the moving direction of the object and the shooting direction of the camera;
when the moving direction of the object and the shooting direction of the camera are opposite to each other, the viewing angle determining device determines that the viewing direction of the object with respect to the camera is a front viewing direction;
when the moving direction of the object and the shooting direction of the camera are the same, the viewing angle determining device determines that the viewing direction of the object with respect to the camera is a back viewing direction; and
when the moving direction of the object and the shooting direction of the camera are perpendicular to each other, the viewing angle determining device determines that the viewing direction of the object with respect to the camera is a side viewing direction.

10. A non-transitory computer readable medium having a computer program recorded thereon, the computer program configured to perform a method when executed on a computer, the method comprising:
estimating a first viewing direction of a first object captured by a first camera and a second viewing direction of a second object captured by a second camera, respectively;
extracting one or more features respectively from an image containing the first object captured by the first camera and an image containing the second object captured by the second camera;
allocating a weight for each of the one or more features according to the first viewing direction and the second viewing direction;
calculating a similarity between the first object and the second object based on the one or more weighted features, to determine whether the first object and the second object are a same object, wherein:
the weight for each of the one or more features reflects a relationship between the first and second viewing directions and effectiveness of the one or more features for object recognition under the first and second viewing directions;
estimating a viewing direction of an object with respect to a camera capturing the object includes:
obtaining a shooting direction of the camera;
estimating a moving direction of the object based on images captured by the camera; and
determining the viewing direction of the object with respect to the camera according to the moving direction of the object and the shooting direction of the camera; and
detecting the viewing direction of the object captured by the camera by using a viewing direction classifier,
wherein the determining of the viewing direction of the object with respect to the camera according to the moving direction of the object and the shooting direction of the camera includes:
calculating correlation probabilities between each of a plurality of viewing directions and an angle which is between the moving direction of the object and the shooting direction of the camera, respectively, and
calculating probability values of the object being in each of the plurality of viewing directions according to the correlation probabilities and a detection result of the viewing direction classifier, and determining a viewing direction corresponding to a largest probability value among the plurality of viewing directions as the viewing direction of the object with respect to the camera.

11. An object recognizing apparatus, comprising:
a viewing direction estimating device that respectively estimates a first viewing direction of a first object captured by a first camera and a second viewing direction of a second object captured by a second camera;
a feature extracting device that extracts one or more features respectively from an image containing the first object captured by the first camera and an image containing the second object captured by the second camera; and
an object matching device that allocates a weight for each of the one or more features according to the first viewing direction and the second viewing direction, and calculates a similarity between the first object and the second object based on the one or more weighted features, to determine whether the first object and the second object are a same object, wherein:
the weight for each of the one or more features reflects a relationship between the first and second viewing directions and effectiveness of the one or more features for object recognition under the first and second viewing directions;

the viewing direction estimating device includes:
  a shooting direction obtaining device that obtains a shooting direction of a camera;
  a moving direction estimating device that estimates a moving direction of an object based on images captured by the camera;
  a viewing angle determining device that determines a viewing direction of the object with respect to the camera according to the moving direction of the object and the shooting direction of the camera; and
  a viewing direction classifier that detects the viewing direction of the object captured by the camera,
  wherein the viewing angle determining device respectively calculates correlation probabilities between each one of a plurality of viewing directions and an angle which is between the moving direction of the object and the shooting direction of the camera, and calculates probability values of the object being in each of the plurality of viewing directions according to the correlation probabilities and a detection result of the viewing direction classifier, and determines a viewing direction corresponding to a largest probability value among the plurality of viewing directions as the viewing direction of the object with respect to the camera.

12. An object recognizing method, comprising:
  estimating a first viewing direction of a first object captured by a first camera and a second viewing direction of a second object captured by a second camera, respectively;
  extracting one or more features respectively from an image containing the first object captured by the first camera and an image containing the second object captured by the second camera;
  allocating a weight for each of the one or more features according to the first viewing direction and the second viewing direction;
  calculating a similarity between the first object and the second object based on the one or more weighted features, to determine whether the first object and the second object are a same object, wherein:
  the weight for each of the one or more features reflects a relationship between the first and second viewing directions and effectiveness of the one or more features for object recognition under the first and second viewing directions;
  estimating a viewing direction of an object with respect to a camera capturing the object includes:
    obtaining a shooting direction of the camera;
    estimating a moving direction of the object based on images captured by the camera; and
    determining the viewing direction of the object with respect to the camera according to the moving direction of the object and the shooting direction of the camera; and
  detecting the viewing direction of the object captured by the camera by using a viewing direction classifier,
    wherein the determining of the viewing direction of the object with respect to the camera according to the moving direction of the object and the shooting direction of the camera includes:
      calculating correlation probabilities between each of a plurality of viewing directions and an angle which is between the moving direction of the object and the shooting direction of the camera, respectively, and
      calculating probability values of the object being in each of the plurality of viewing directions according to the correlation probabilities and a detection result of the viewing direction classifier, and determining a viewing direction corresponding to a largest probability value among the plurality of viewing directions as the viewing direction of the object with respect to the camera.

* * * * *